Patented July 11, 1939

2,165,533

UNITED STATES PATENT OFFICE 2,165,533

PROCESS OF PREPARING PHENYLMER-CURIC COMPOUNDS

Donald B. Bradner, Hamilton, Ohio, assignor to The Hamilton Laboratories, Inc., Hamilton, Ohio, a corporation of Delaware No Drawing. Application April 11, 1936, Serial No. 73,936

6 Claims. (Cl. 260—433)

This invention relates to processes of preparing phenylmercuric compounds; and it comprises a method wherein a phenylmercuric halide or other relatively insoluble phenylmercuric salt is precipitated from a solution of an impure phenylmercuric compound, the precipitate is treated with a limited quantity of a hot alkaline solution to give a solution of phenylmercuric hydroxide, the solution is separated from any insoluble material, the solution is cooled, the mother liquor is separated from the solids which crystallize and which consist for the most part of phenylmercuric hydroxide, the solids are washed and the phenylmercuric hydroxide is dissolved in water; advantageously the phenylmercuric hydroxide solution being then neutralized with an acid to produce any desired phenylmercuric salt in a high degree of purity.

Although, for the sake of simplicity, this invention will be described with particular reference to unsubstituted phenylmercuric compounds represented by the formula $C_6H_5HgX$ where X is an element or radical which exists as an anion when the compound is dissolved in water, it can also be used for the preparation or purification of certain substituted phenylmercuric compounds, and the invention can be more broadly stated to include the preparation of compounds of the type R-Hg-X where R represents a phenyl radical carrying no substituent groups which will react with either alkalies or acids to form salts and where X is an element or radical which exists as an anion when the compound is dissolved in water. Included in the compounds embraced by the invention are such compounds as the nitro, halogen, and hydrocarbon substituted phenylmercuric derivatives, such as for example, p tolylmercuric chloride

nitrophenyl mercuric acetate, etc. It will therefore be understood in this specification that the term "phenylmercuric" includes also the aforesaid substituted phenylmercuric compounds.

The compounds to which this invention relates have powerful germicidal and antiseptic properties and at the same time the toxic effects of these compounds on man and higher animals are comparatively slight. Traces of impurities may impair their germicidal effectiveness and are very liable to produce severe irritation or other toxic effects.

The present invention provides a simple and economical process for the purification of phenylmercuric compounds to the high degree of purity necessary for medical purposes. It also provides a simple method for the preparation of phenylmercuric compounds which are relatively soluble in water and which have hitherto only been prepared by expensive roundabout processes.

The method is applicable either to the crude reaction product resulting from the mercurization of benzene or to partially purified phenylmercuric compounds. In carrying out the invention a phenylmercuric compound is first dissolved in water and is then precipitated as a relatively insoluble phenylmercuric salt. For this purpose, I recommend adding hydrochloric acid, whereby phenylmercuric chloride, $C_6H_5HgCl$, is precipitated. In place of hydrochloric acid, other chlorides, halides, or even nitrates may be used. The essential point in this step is to precipitate a relatively insoluble phenylmercuric compound from an impure aqueous solution of a phenylmercury compound. In case the compound being purified is basic, it is necessary to add an acid instead of or in addition to a neutral salt in order to completely precipitate the phenylmercuric compound.

In case the starting material is already relatively insoluble in water, as for example phenylmercuric chloride, the step of precipitating the insoluble compound may be omitted.

In any case the insoluble phenylmercuric salt is thoroughly washed, advantageously with water, to remove soluble impurities therefrom. This may be done by the usual methods of decantation, filtering, etc. The precipitated phenylmercuric salt is next converted into phenylmercuric hydroxide. This may be done by digesting with a hot solution of caustic soda, sodium carbonate or other suitable alkaline solution. The mixture is then filtered hot. Any insoluble residue is thereby separated from the alkaline solution. The hot filtrate, containing the phenylmercuric hydroxide in solution, is allowed to cool. A precipitate consisting mostly of phenylmercuric hydroxide and some phenylmercuric chloride separates out.

This precipitate is filtered and washed with cold water to remove the alkali and soluble chlorides, the filtrate and washings being ordinarily treated with hydrochloric acid to recover phenylmercuric salts which would otherwise be lost. The precipitate of phenylmercuric hydroxide and chloride is then extracted with water by digesting with hot water, cooling and filtering. The filtrate consists of a solution of practically pure phenylmercuric hydroxide. Due to the very low solubility of phenylmercuric chloride in pure water, practically all of t.'s compound remains on the filter along with any other insoluble impurities. If desired, the filtrate containing the pure phenylmercuric hydroxide may then be treated with an equivalent amount of an appropriate acid to form the phenylmercuric salt desired. In this connection, the phenylmercuric content is first determined by titration with standard potassium thiocyanate solution and the calculated quantity of acid is added. The phenylmercuric salt produced may precipitate out and be collected or it may remain in solution depending upon the solubility of the particular salt.

In carrying out the invention advantage is taken of the fact that phenylmercuric hydroxide is sufficiently insoluble in water at ordinary temperatures to enable it to be precipitated and washed free of alkali and other soluble materials which may be present, and yet soluble enough to permit it to be readily separated from the chloride by water extraction on a practical scale.

In case it is desired to purify the crude phenylmercuric acetate resulting from the digestion of benzene, acetic acid and mercuric acetate, it is sometimes advantageous to first heat the impure acetate with caustic solution, filter into a large quantity of water, acidify with acetic acid and filter. Hydrochloric acid is then added to the filtrate to precipitate phenylmercuric chloride, which is then washed and treated as above described.

The following example will serve to illustrate the process in detail.

Two pounds of phenylmercuric acetate were heated with 200 grams of sodium hydroxide in 4 gallons of water. The resulting solution was filtered hot and poured into 45 gallons of water. The solution was just acidified with acetic acid and filtered. Hydrochloric acid was added to the filtrate until no further precipitation occurred. The precipitate was filtered off and washed. The partly purified phenylmercuric chloride was again converted to phenylmercuric hydroxide by treatment with hot sodium hydroxide solution in the proportion of 100 grams sodium hydroxide in 2 gallons of water for every pound of phenylmercuric chloride. The reaction mixture was filtered hot and then allowed to cool. A precipitate consisting mostly of phenylmercuric hydroxide and some phenylmercuric chloride settled out. This was filtered and carefully washed with water. The phenylmercuric hydroxide, which is soluble to the extent of about one per cent in cold water, was dissolved in approximately 18 gallons of water. The solution was filtered cold, and the insoluble residue was recovered as phenylmercuric chloride. The filtrate was practically free of phenylmercuric chloride due to the very low solubility of phenylmercuric chloride in water. Analysis showed it to contain 6.5 grams of phenylmercuric hydroxide per liter of solution, and to this was added 0.67 gram of gluconic acid for every gram of phenylmercuric hydroxide to produce a solution of phenylmercuric gluconate. The solution of phenylmercuric gluconate was of a high degree of purity and satisfactory for medical purposes. The various filtrates and washings which would ordinarily have gone to waste in the above procedure were combined, acidified with hydrochloric acid and the phenylmercuric content recovered as phenylmercuric chloride.

I claim:

1. Process of preparing phenylmercuric salts in pure form, which comprises converting a phenylmercuric compound into a phenylmercuric halide, treating said phenylmercuric halide with a hot alkaline solution to give a hot concentrated solution of phenylmercuric hydroxide, separating this solution from insoluble material, cooling the solution, separating the solids which crystallize out, washing the solids to remove soluble material, extracting the solids to form a solution of phenylmercuric hydroxide and then treating the phenylmercuric hydroxide with an acid.

2. Process of preparing phenylmercuric salts in pure form which comprises converting a phenylmercuric compound into a phenylmercuric chloride, treating said phenylmercuric chloride with a hot caustic solution to give a hot concentrated solution of phenylmercuric hydroxide, separating this solution from insoluble material, cooling the solution, separating the solids which crystallize out, extracting the solids to form a solution of phenylmercuric hydroxide and then treating the phenylmercuric hydroxide with an acid.

3. Process of making highly purified phenylmercuric salts from crude phenylmercuric acetate, which comprises digesting the phenylmercuric acetate with a hot solution of alkali, filtering off any insoluble matter and diluting the filtrate with water, adding hydrochloric acid to the filtrate, filtering off and washing the precipitated phenylmercuric chloride, treating the phenylmercuric chloride with hot caustic alkali solution, filtering, cooling the filtrate, filtering off the precipitate which separates from the filtered liquor upon cooling, washing with cold water, then extracting with more water to form a solution of pure phenylmercuric hydroxide, filtering, and neutralizing the solution of phenylmercuric hydroxide with an acid.

4. A process for preparing, in pure form, phenylmercuric compounds of the type which yields R—Hg+ as cation and in which the phenyl radical carries no substituent groups capable of forming salts, which comprises converting a compound of the type defined into a relatively insoluble salt, the cation of which is R—Hg+, treating said insoluble salt with a hot alkaline solution to give a concentrated solution of R—Hg—OH, cooling the solution, separating the solids which crystallize out, extracting the solids to form a solution of R—Hg—OH and then treating the R—Hg—OH with an acid.

5. The process of making pure preparations from phenylmercuric compounds of the type which yields R—Hg+ as cation and in which the phenyl radical carries no substituent groups capable of forming salts, which comprises treating such a compound with a highly alkaline solution to give a concentrated solution of a hydroxide, cooling the solution to produce crystallization, washing the crystals and then redissolving the hydroxide in water.

6. The process of preparing a phenylmercuric hydroxide R—Hg—OH in pure form from a phenylmercuric salt of the type which yields R—Hg+ as cation and in which the phenyl radical carries no substituent groups capable of forming salts, which comprises treating such a salt with a hot alkaline solution to give a concentrated solution of R—Hg—OH, cooling the solution to cause precipitation of solids including R—Hg—OH, separating the solids and then extracting said solids with water to form a solution of R—Hg—OH.

DONALD B. BRADNER.